(No Model.) 2 Sheets—Sheet 1.

W. GUTENKUNST.
COMBINED FEED CUTTER AND CORN HUSKER.

No. 460,336. Patented Sept. 29, 1891.

Witnesses.
O. H. Keeney,
Anna V. Faust.

Inventor.
William Gutenkunst
By C. H. Benedict
Attorney.

THE NORRIS PETERS CO., PHOTO-LITHO., WASHINGTON, D. C.

(No Model.) 2 Sheets—Sheet 2.
W. GUTENKUNST.
COMBINED FEED CUTTER AND CORN HUSKER.
No. 460,336. Patented Sept. 29, 1891.
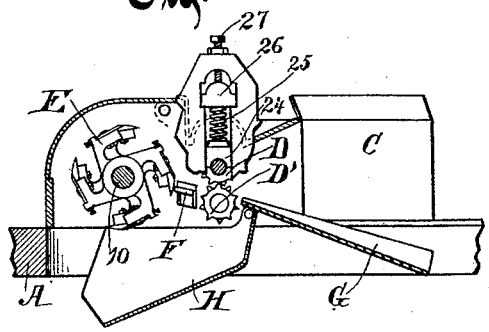
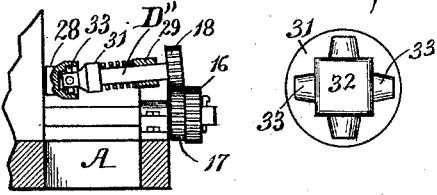
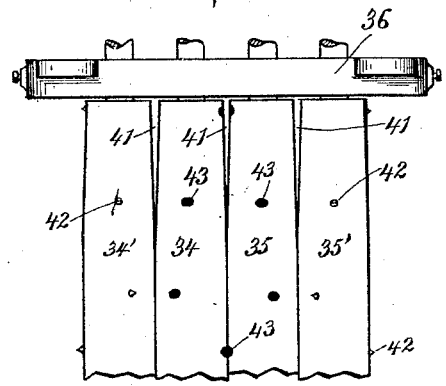
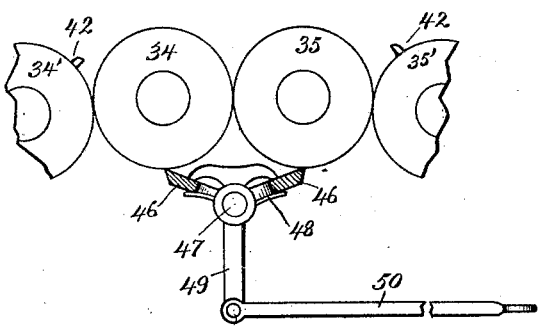
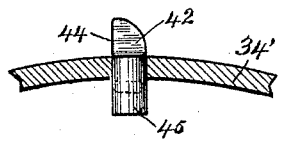
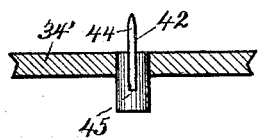

UNITED STATES PATENT OFFICE.

WILLIAM GUTENKUNST, OF MILWAUKEE, WISCONSIN, ASSIGNOR TO THE MILWAUKEE HAY TOOL COMPANY, OF SAME PLACE.

COMBINED FEED-CUTTER AND CORN-HUSKER.

SPECIFICATION forming part of Letters Patent No. 460,336, dated September 29, 1891.

Application filed April 9, 1891. Serial No. 388,267. (No model.)

*To all whom it may concern:*

Be it known that I, WILLIAM GUTENKUNST, of Milwaukee, in the county of Milwaukee and State of Wisconsin, have invented a new and useful Improvement in a Combined Feed-Cutter and Corn-Husker, of which the following is a description, reference being had to the accompanying drawings, which are a part of this specification.

My invention relates to improvements in the machine for which Letters Patent No. 440,826 were issued on November 18, 1890.

The object of the present invention is to provide means for adjusting and regulating the cut of the feed-cutter, to so construct and arrange the husking-rollers as to permit dirt and other foreign matter to be dropped therefrom and at the same time to obviate a clogging of the huskers by ears of corn falling endwise thereon, and to modify and improve other features of the machine, whereby new or better results are obtained or desirable features of construction are accomplished.

Figure 1:
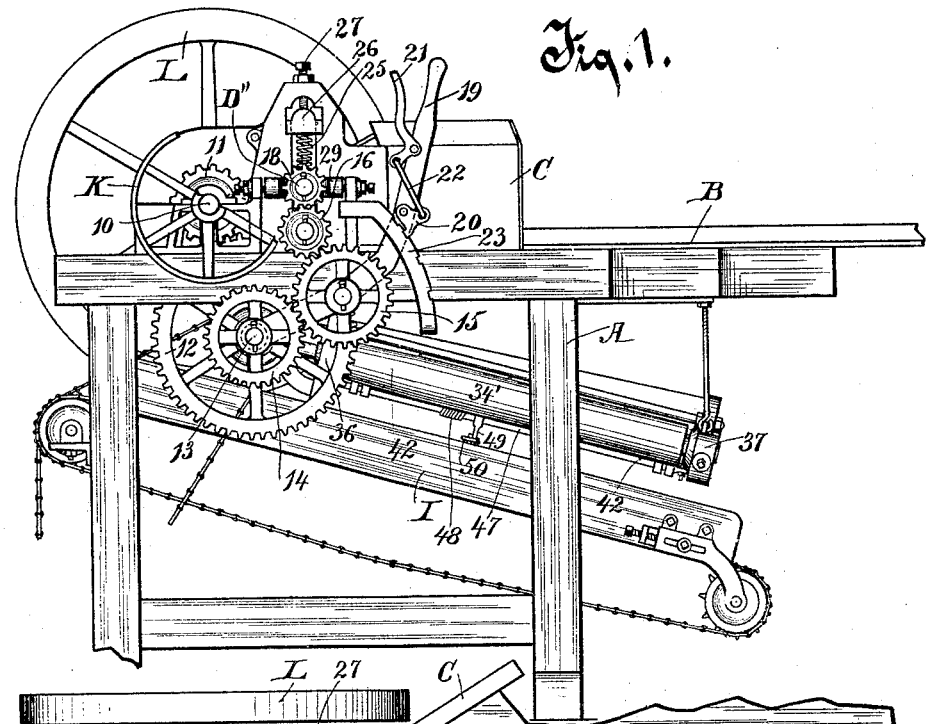
Figure 2:
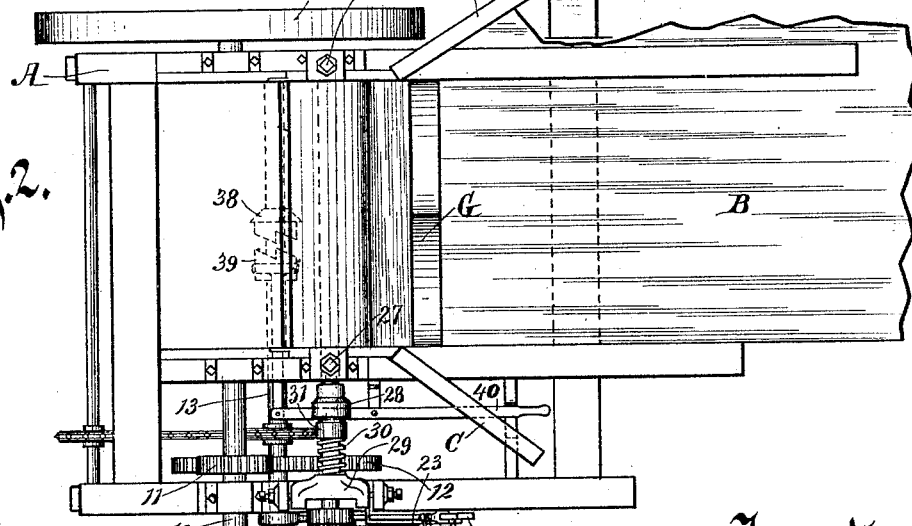

In the drawings, Figure 1 is a side elevation of my improved machine, the band-wheel and other parts distant from the operative mechanism being broken away for convenience of illustration. Fig. 2 is a top plan view of the same machine, a portion of the feed-table being broken away for convenience of illustration. Fig. 3 is a vertical section of the feed-cutter and adjacent parts of the mechanism. Fig. 4 is a top plan view of a fragment of the husking-rollers and the head-block or transverse frame in which they are journaled. Fig. 5 is a fragment of the feed-roller shafts and gear, showing the universal joint provided in the upper feed-roller shaft. Fig. 6 is a view of the inner end of that outer portion of the upper feed-roller shaft shown in Fig. 5. Fig. 7 is a vertical transverse section of the husking-rollers and of the scrapers or cleaners of the central rollers, showing therewith my improved device for tilting the cleaners away from the rollers. Fig. 8 is a tooth of a husking-roller shown in connection with a transverse section of the roller. Fig. 9 is the same tooth shown in Fig. 8, but at right angles thereto and in a longitudinal section of the husking-roller.

The frame A is of suitable form to support the operative parts of the machine.

B is a feed-table, on which the stalks and corn thereon are placed to be fed to the machine.

C C are wings erected on the frame at the side of the feed-table to guide the stalks to the feed-rollers. The feed-rollers D and D' are journaled in the frame, the lower feed-roller D' being journaled in boxes fast on the frame, while the upper feed-roller D is journaled in boxes movable vertically in the frame. The revolving cutter E is journaled in the frame at the rear of the feed-rollers, the knives of which are arranged to cut the stalks by a shearing movement alongside the fixed shear-plate F, arranged transversely of the machine. The feed-rollers are provided with longitudinal corrugations or ribs for more satisfactorily feeding the stalks through the machine and for snapping or breaking the ears of corn from the stalks as the ears come to the feed-rollers while the stalks are passing between them. The ears of corn are broken off and fall in front of the feed-rollers onto an inclined chute G, on which by gravity they slide down to the husking-rollers. The cut feed falls on a chute H, which delivers it to the conveyer I, which extends below the husking-rollers and receives the husks and transports the cut feed and husks from the machine. The cutter-shaft is provided with a band-wheel K and a fly-wheel L.

The shaft 10, on which the cutter E is fixed, is provided with a gear-wheel 11, meshing with the wheel 12, fixed on the shaft 13, which shaft 13 has its bearings in the frame and is provided with a gear-wheel 14, meshing with an idle-gear 15, which in turn meshes with the pinion 16 on the shaft of the lower feed-roller D'. Another pinion 17 on the shaft of the lower feed-roller meshes with the pinion 18 on the shaft of the upper feed-roller D. The idle-gear 15 is loose axled on a pin fixed in a swinging hand-lever 19. The hand-lever 19 is pivoted at its lower end conveniently on the shaft 13, and is provided with a gravity-latch 20, operated by the tilting lever 21, the lever 21 and latch 20 being pivoted on the lever-handle 19 and being connected together by a link 22. The gravity-latch 20 is adapted to take into a segmental rack 23, fixed on the frame, and lock the lever-handle 19 in position. The support of the idle-gear 15 on the lever-handle 19 is adapted for throwing the idle-gear 15 into or out of mesh with gears 14 and 16, respectively, and this arrangement provides for removing the idle-gear 15 and the gear 14 from its pin and shaft, respectively, and substituting therefor other gears of different diameters, whereby the rate of speed of the feed-rollers is increased or diminished, as desired, for the purpose of increasing or diminishing the length of the cut of the stalks by increasing or diminishing the rapidity of the feed of the stalks between the rollers to the cutter.

The shaft of the upper feed-roller D has its bearings at both ends in journal-boxes 24, located above the shaft only, the lower half of the box being omitted to avoid the accumulation of dirt and foreign matter in the bearing. These half journal-boxes 24 are movable vertically in ways therefor in the frame, and they are held yieldingly toward the lower feed-roller by the springs 25, inserted between them, and a movable cap 26, also movable in vertical ways in the frame and adjustable by means of the set-screws 27. The outer end D'' of the shaft of the upper feed-roller D is connected revolubly with the main shaft by a universal joint 28, and this portion D'' of the shaft has its journal-bearing in a yoke 29, pivoted in the frame, through which yoke the part D'' is movable revolubly and endwise. A spring 30, coiled about this portion of the shaft, bears against the yoke 29 and against a terminal collar or head 31 on this part of the shaft, and holds this part D'' yieldingly in operative connection with the shaft of the feed-roller. This head 31 is provided with a terminal part 32, substantially square in cross-section, having diametrically-opposite and right-angled studs or pins 33 projecting from the sides thereof, and this part 32 and the pins 33 enter loosely a socket therefor of corresponding form in the outer end of the main shaft of the feed-roller D, whereby the part D'' is universally jointed to the principal shaft, permitting the raising and lowering of the feed-roller as stalks are fed through the machine. The pinion 18 is fixed on the part D'' of the shaft.

Two sets of husking-rollers 34 and 34' and 35 and 35', located substantially parallel to and near each other, are arranged in an inclined position at right angles to the feed-rollers, and are journaled, respectively, in the cross-head 36 and tail-bar 37. These husking-rollers are geared to each other at their upper ends, one of which rollers is geared to the pinion 38, loose on shaft 13, arranged to be clutched thereto through the clutch-collar 39, splined on the shaft 13 and movable endwise by means of the hand-lever 40, pivoted on the frame and riding in a groove therefor in the clutch-collar.

To permit any dirt or foreign material that may fall off of the stalks or out of the husks onto the chute G, therefrom onto the husking-rollers, to pass between the husking-rollers, and also to obviate the catching and holding ears upright on the husking-rollers as they fall thereon from the chute G, I bevel off the husking-rollers at their upper ends, so as to leave an open space 41 between them for the purpose suggested. Each of the husking-rollers 34' 35' is provided with a number of cutting-teeth 42, fixed in the wall of the hollow rollers and arranged to register with and enter corresponding apertures 43 therefor in the rollers 34 and 35. These teeth are advisedly severally made of a flat blade 44, having a sharp curved front edge, which blade is cut from a piece of sheet-steel and is inserted in a socket therefor in a cylindrical stock or plug 45, inserted and fitted in an aperture therefor in the wall of the roller.

For the purpose of clearing the central adjoining rollers 34 35 of any husks or silk of the corn that may be attached thereto and accumulate thereon, a pair of scrapers 46 46, hinged on the intermediate rod 47, which is supported in the cross-head 36 and tail-bar 37, bear, respectively, against the under surfaces of the rollers 34 and 35 throughout their length, being held yieldingly thereto by springs 48. These scrapers are liable to become clogged with silk and husks, and for the purpose of tilting them temporarily away from the rollers for cleaning them I provide a T-headed lever 49, pivoted medially on the rod 47, the extremities of the arms of which T-lever bear against the upper surfaces, respectively, of the scrapers. A laterally-extending rod-handle 50, pivoted at its inner end to the lower extremity of the lever 49, is adapted for pushing or pulling against the lever, whereby it is tilted and forces the corresponding scraper away from the husking-roller, against which it normally bears.

What I claim as new, and desire to secure by Letters Patent, is—

1. In a feed-cutter, the combination, with a pair of feed-rollers geared to each other, a driving-shaft, and a detachable gear thereon at a distance from the gear on the feed-rollers, of a swinging hand-lever pivoted at one extremity about the driving-shaft, an idle-gear mounted detachably on the lever medially at such distance from its pivotal point as to be constantly in mesh with the gear on the driving-shaft, the idle gear being adapted by swinging the lever to be put in mesh with or to be released from the gear on one of the feed-rollers, the gears on the hand-lever and driving-shaft being detachable and adapted to be replaced, respectively, by a larger or smaller gear, and means for locking the lever in place, substantially as described.

2. In a feed-cutter, the combination of an upper feed-roller journaled near its ends in yielding vertically-movable blocks, an extending portion of the shaft connected to the main portion of the shaft of the feed-roller by a universal joint, consisting of studs projecting laterally at right angles to each other and to the axis of the shaft into sockets therefor in the other part of the shaft, a yoke extending and pivoted in the frame in a line at right angles to the plane of vertical movement of the feed-roller, in which yoke the extension of the shaft is journaled near its outer end, and a pinion on the outer end of the extension-shaft meshing with driving mechanism, substantially as described.

3. In a feed-cutter and corn-husker, sets of husking-rollers arranged in pairs, with axes parallel to each other and in a plane inclined downwardly toward the outer ends of the rollers, the rollers being adapted to receive ears of corn thereon at their inner and higher ends, on which rollers the ears move downwardly by gravity, which rollers are tapered or beveled for a distance at their upper ends sufficiently to form a narrow wedge-shaped space between each pair of rollers, through which dirt and foreign matter may by gravity fall from the ears of corn while the rollers support and carry the ears forward, as and for the purpose set forth.

4. In a corn-husker, the combination, with husking-rollers arranged parallel and adjacent to each other and scrapers hinged to an intermediate rod and bearing, respectively, against the rollers, of a T-formed lever pivoted on the intermediate rod, the arms of which bear against the respective scrapers and are adapted by the tilting of the lever to force the scrapers respectively away from the rollers, substantially as described.

In testimony whereof I affix my signature in presence of two witnesses.

WILLIAM GUTENKUNST.

Witnesses:
   C. T. BENEDICT,
   ANNA V. FAUST.